United States Patent [19]
Drozhzhin et al.

[11] 3,939,846
[45] Feb. 24, 1976

[54] DEVICE FOR MONITORING AND CONTROLLING THE RELATIVE FLOWS AND LOSSES OF GRAIN IN A GRAIN COMBINE THRESHER

[76] Inventors: Vladimir Kirillovich Drozhzhin, 3 Artilleriisky proezd, 32; Alexandr Pavlovich Sergeev, ulitsa Frunze, 55a, kv. 67; Vladimir Pavlovich Shevchenko, ultisa P. Tolyatti, 42, kv. 24; Vitaly Evdokimovich Buyanov, ulitsa Dzerzhinskogo, 177, kv. 2; Viktor Ivanovich Bolotov, ulitsa Sverdlova, 43, kv. 7; Viktor Mikhailovich Yakut, ulitsa Portovaya, 1, kv. 32; Jury Tikhonovich Polenov, prospekt Ukrainsky, 25, kv. 4, all of Taganrog; Nikolai Nikolaevich Luchinsky, ulitsa Vavilova, 56, kv. 188; Mai Mikhailovich Dvorkind, ulitsa Vavilova, 56, kv. 180; Sergei Alexeevich Alferov, ulitsa Mikhailova, 33, korpus 3, kv. 81, all of Moscow; Alexandr Fedorovich Morozov, ulitsa Tsentralnaya, 9, kv. 7, Solnechnogorsk Moskovskoi oblasti; Alexandr Trofimovich Anashkin, ulitsa Trudovykhrezervov, 2-1, kv. 25; Isaak Zinovievich Avrutin, Oktyabrskaya ploschad, 2, kv. 48, both of Taganrog, U.S.S.R.; Tatyana Moiseevna Voronova, ulitsa Kirova, 24, kv. 71, Moscow, all of U.S.S.R.

[22] Filed: June 27, 1974

[21] Appl. No.: 483,513

[52] U.S. Cl............ 130/27 R; 56/10.2; 56/DIG. 15
[51] Int. Cl.²........................................ A01F 12/00
[58] Field of Search................... 56/10.2, DIG. 15; 130/27 R, 24

[56] References Cited
UNITED STATES PATENTS

| 3,481,122 | 12/1969 | Pool et al............................ 56/10.2 |
| 3,515,144 | 6/1970 | Morrison ........................ 56/10.2 X |
| 3,574,307 | 4/1971 | Theobald............................ 130/24 |
| 3,593,720 | 7/1971 | Botterill et al............. 56/DIG. 15 X |
| 3,606,745 | 9/1971 | Girodat...................... 56/DIG. 15 X |
| 3,610,252 | 10/1971 | De Coene et al.......... 56/DIG. 15 X |

Primary Examiner—Paul E. Shapiro
Assistant Examiner—Harry G. Strappello
Attorney, Agent, or Firm—Lackenbach, Lilling & Siegel

[57] ABSTRACT

A device includes a transducer for measuring the amount of grain lost by the thresher and a transducer for measuring the amount of grain supplied to the hopper of a grain combine which transducers are connected through an electronic unit in the form of a ratio detector to an indicator calibrated in relative units to register the ratio of the output signals of the transducers for indicating the the magnitudes or rates of grain flow and of the changes in the process of separation of grain in the grain combine. The transducer for measuring the amount of grain supplied to the hopper of the grain combine is installed under the sieve of the cleaner and has an elongated form and a width which is smaller than that of the sieve of the grain combine. The utilization of the device reduces the losses of grain in the thresher and improves labour productivity.

4 Claims, 3 Drawing Figures

DEVICE FOR MONITORING AND CONTROLLING THE RELATIVE FLOWS AND LOSSES OF GRAIN IN A GRAIN COMBINE THRESHER

BACKGROUND OF THE INVENTION

The present invention relates to devices used in agricultural equipment, and more particularly, to devices applied to controlling the magnitudes or rates of flow and losses of grain in the grain combine thresher.

The present invention can most efficiently be utilized in grain harvesters and grain cleaning machines.

Known in the prior art are devices for determining losses of grain in the grain combine thresher by determining the amount of grain sieved at the end of the rack, the amount of grain being proportional to grain losses through the rack.

One of these devices incorporates a funnel for collecting the separated grain at the end of the rack and an electroacoustic transducer or pick-up which is acted upon by grain from the funnel and connected to the means for registering the readings of the pick-up which is used as an indicator located in the sight view of the operator.

The grain seaved from the straw at the end of the rack is supplied through the funnel to the sensitive surface of the electroacoustic pick-up. The grains falling onto the sensitive surface generate electric pulses whose frequency is converted to the readings of the indicator calibrated in number of grains per unity of time.

In the mentioned device the errors for determining the losses of grain are influenced by the physical condition of grain, and particularly, the absolute weight of the grains which is changed depending on the conditions or duration of crop harvesting. This leads to errors in assessing and selecting the mode of operation of the grain combine.

Also known is a device which concurrently with the control of grain loss in the grain combine thresher measures and controls the amount of grain supplied to its hopper.

The mentioned device comprises a grain pick-up or transducer which measures the grain lost by the thresher and installed on the grain outlet from the additional separator of grain whose amount is proportional to total losses or transducer which measures the grain in the thresher, and a pick-up of the amount of grain supplied to the hopper of the combine and located in the upper head of the grain elevator feeding grain to the hopper. Each of the mentioned pick-ups in the device is independently connected with the independent means for registering the readings of the pick-ups which are used as indicators which, in turn, indicate the amount of grain lost by the thresher and the amount of grain supplied to the hopper of the grain combine. For transducer or pick-ups use can be made of electromechanical or capacitance pick-ups or volumetric pick-ups.

The pick-up for measuring the amount of grain proceeding to the hopper takes measurements of the total amount of grain supplied to the hopper at any given time.

The pick-up which measures the amount of grain lost by the rack of the thresher takes measurements of the amount of grain which is proportional to the total amount of grain lost by the rack at any given time.

The readings of the corresponding indicators are proportional to the quantity or rates of grain flow controlled by the pick-ups.

In the known device the pick-up which measures the amount of grain supplied to the hopper is located behind the transporting mechanisms of the grain combine which transfers the cleaned grain to its hopper. The flow of grain supplied to the hopper and measured by the pick-up is non-uniform due to the peculiarities of the auger or scrubber transporting mechanisms which supply grain in fluctuating quantities. The fluctuations in supply of grain results in considerable variations of the indicator readings and makes it difficult for the operator to use the readings of the instrument.

The location of the pick-ups which measure the amount of grain proceeding to the hopper directly in the hopper increases the lag period of the signal sent therefrom to the indicator as compared with the moment of supply of the plant mass to the grain combine. This results in a delay in changing the mode of operation of the grain combine which is changed by the operator in accordance with the signal obtained.

In the mentioned devices the errors of determining the losses of grain and the amount of grain supplied to the hopper are considerably influenced by the physical condition of grain, namely, its humidity and absolute weight which are varied due to the condition and duration of harvesting, thereby leading to establishing faulty modes for the combine operation.

The measurement of the total amount of grain supplied to the hopper calls for the utilization of large-size pick-ups of complex design which makes them expensive.

SUMMARY OF THE INVENTION

An object of the present invention is to provide a device which makes it possible to carry out measurements of the grain flowing to the hopper of the grain combine with a lower time lag as compared to the moment when the plant mass arrives at the grain combine.

Another object of the invention is to provide a device which makes it possible to take measurements of the grain losses in the thresher of the grain combine characterized by the ratio of the output signals of the device pick-ups eliminating the effect of the absolute weight of the grain on the pick-up.

An additional object of the present invention is to provide a device ensuring a more accurate and complete assessment of the grain losses in the grain combine thresher as compared to the known devices and the detection of faults in the production process accomplished therein.

To solve the formulated task a device is provided for controlling the magnitudes or rates of flow and losses of grain in the grain combine thresher, comprising the first means on the combine for detecting the amount of grain lost in its thresher and second means for detecting the amount of grain supplied to the hopper of the grain combine, and means for registering the readings of said detecting means, wherein, according to the invention, said second detecting means for detecting the amount of grain supplied to the hopper of the grain combine is in the nature of a piezoelectric transducer with an elongated sensitive surface located under the sieve whose elongated side is oriented in the direction of the longitudinal axis of the grain combine and having a width smaller than that of the sieve, with the outputs of said detecting means being connected to an electronic unit generating an output signal proportional to the ratio of the output signals of said detecting means and sent to the indicator which is connected to the output of the electronic unit and calibrated in relative units characterizing the relative magnitudes or rates of grain flow and the variation in the process of separation of grain in the thresher.

The arrangement of said second means for detecting of the amount of grain supplied to the hopper as specified in the invention is the place from where the flow of cleaned grain starts moving in the grain combine.

Detection of the amount of grain in any point of the flow is immediately after the location of interest where the transducers or pick-ups are located. The time lag of the signal arriving from the pick-up as compared to the moment at which the plant mass proceeds to the combine is thereby decreased. Therefore, the location of the pick-up under the cleaning sieve in the flow of the separated grain provides a minimum time lag for the signal indicating the amount of grain supplied to the hopper, thereby making it possible to rapidly detect a change in the production process of grain separation during the operation of the grain combine.

The location of the pick-up for measurement of the amount of grain supplied to the hopper of the grain combine under the sieve makes it possible to eliminate the effect of the transport working members on the uniformity of the grain flow, thus improving the conditions for measuring its magnitudes or rates of flow.

The magnitude or rate of the flow of grain separated by sieve is smaller than the magnitude of the flow of grain transferred to the hopper by the transport working member of the grain combine. This makes it possible to use a piezoelectric pick-up for determining the amount of grain since such pick-up is substantially immune or totally insensitive to the vibrations of the combine as compared with other known pick-ups, and being at the same time least sensitive to differences in physical condition of the grain. In addition, the piezoelectric pick-up does not require electric energy to be directly supplied thereto or mechanical movement, and is convenient in operation.

Making the sensitive surface of the pick-up having an elongated form with a width smaller than the width of the sieve and the location of the elongated side of the surface along the longitudinal axis of the grain combine allows measurements to be taken of only a portion of the amount of grain proportional to the total amount of grain supplied to the hopper of the grain combine. This simplifies the design of the pick-up and makes it less costly as compared to those of the prior art.

According to the invention, the inputs of the pick-up for measurement of the amount of grain lost by the thresher and the pick-up for measurement of the amount of grain supplied to the hopper are connected to the electronic unit which generates a signal proportional to the ratio of the output signals of the mentioned pick-ups, and which is applied to the indicator connected to the output of the electronic unit which is calibrated in relative units.

An objective and adopted assessement for the operation of the grain combine consists in the variation in the value of losses with respect to the amount of grain supplied to the hopper, i.e. the value of the relative losses. The determination of the values of relative losses is also preferable because this value is less changeable in time than the value of the absolute losses, making it easier for the operator to use the readings of the device. The device of the invention provides indicator readings proportional to the ratio of the output signals of the mentioned pick-ups.

The ratio of the signals arriving from the pick-ups eliminate the error resulting from the change of physical properties of grain, which takes place in case of separate measurements of grain losses in the thresher and of the total amount of grain supplied to the hopper of the grain combine.

When the mentioned values are related, the change in the physical properties of grain does not increase the error in determining the relative losses in the thresher of the grain combine.

According to the invention the pick-up is measurement of the amount of grain supplied to the hopper of the grain combine should be rigidly fastened by means of a bracket installed on the grain chute of the grain combine.

The piezoelectric pick-up is rigidly fastened by means of a bracket to ensure permanent conditions for interaction between the grain separated by the sieve and the sensitive surface of the pick-up.

BRIEF DESCRIPTION OF THE DRAWINGS

For a better illustration of the subject of the invention use is made of a detailed description of the invention with reference to the accompanying drawings, wherein.

DESCRIPTION OF THE PREFERRED EMBODIMENT

During the operation of a grain combine losses in its thresher occur in places where the straw comes off the rack and is cleaned and those are places where transducers or pick-ups 1 and 3 are installed for determining the losses of grain behind the mentioned working members of the thresher. It is possible to determine both the total losses of grain and separate losses behind individual separating working members.

Figure 1:
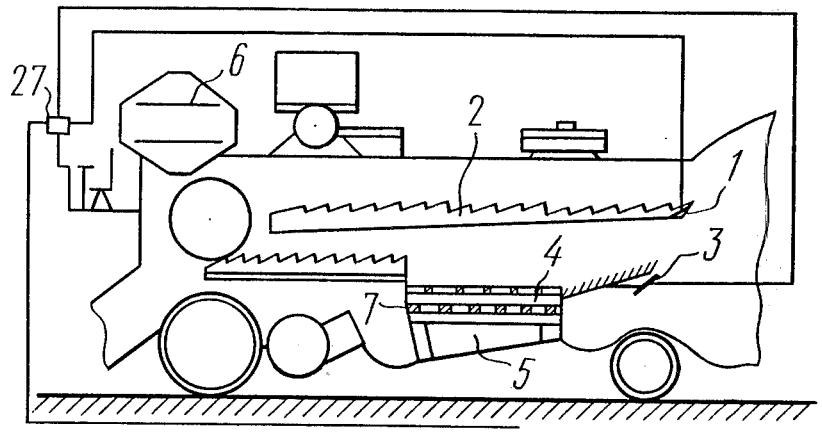
FIG. 1 is a side elevational schematic diagram of a grain combine with a device located thereon for controlling the magnitudes or rates of flow and losses of grain in the thresher of the grain combine.

The proposed invention provides a device for controlling the magnitudes or rates of flow and losses of grain in the thresher of the grain combine. The device includes a transducer or pick-up 1 (FIG. 1) which measures the amount of grain lost by the rack 2 and is installed at the end of the rack 2, a transducer or pick-up 3 which measures the amount of grain lost by the cleaner 4 located at the end of the cleaner 4, and a piezoelectric transducer or pick-up 5 which measures the grain supplied to the hopper 6 of the grain combine and is installed under the sieve 7 to be in the flow of the separated grain separated by the seive 7.

The piezoelectric pick-up 5 exhibits the highest immunity or insensitivity to the vibrations of the combine as compared to other inown transducers and is least sensitive to changes in the physical condition of the grain.

The disposition of the piezoelectric transducer 5 under the sieve 7 in the flow of separated grain ensures minimal lag time for the signal indicating the amount of grain supplied to the hopper 6, thereby making it possible to rapidly detect the variation in the production process of the grain combine, as well as to improve the conditions for measuring the magnitudes or rates of flow.

Figure 2:
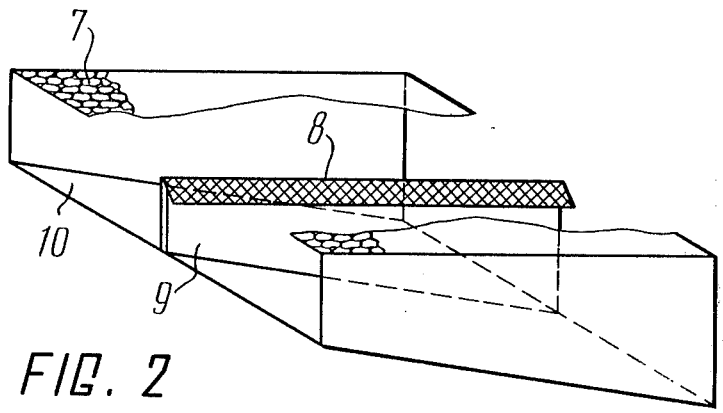
FIG. 2 is partially fragmented perspective view of a portion of the device shown in FIG. 1, showing the transducer for measuring the amount of grain supplied to the hopper of the grain combine.

The sensitive surface 8 (FIG. 2) of the piezoelectric transducer 5 or for measuring the grain supplied to the hopper 6 of the grain combine has an elongated form and its elongated side is oriented along the longitudinal axis of the grain combine. The width of the surface of the pick-up 5 is smaller than the width of the sieve 7 of the cleaner 4.

By constructing the sensitive surface 8 of the pick-up 5 elongated with a width smaller than the width of the sieve 7 and by locating the elongated side of the surface 8 along the longitudinal axis of the grain combine, it is possible to measure only a portion of the amount of grain that is proportional to the total amount of grain sieved through the entire surface of the sieve 7 and supplied to the hopper 6 of the grain combine.

The pick-up 5 is rigidly fastened by means of the bracket 9 installed on the grain chute 10 of the cleaner 4 of the grain combine.

The rigid fixture of the pick-up 5 by means of the bracket 9 provides consistency for the conditions of interaction between the grains separated by the sieve 7 and the sensitive surface 8 of the pick-up 5.

Figure 3:
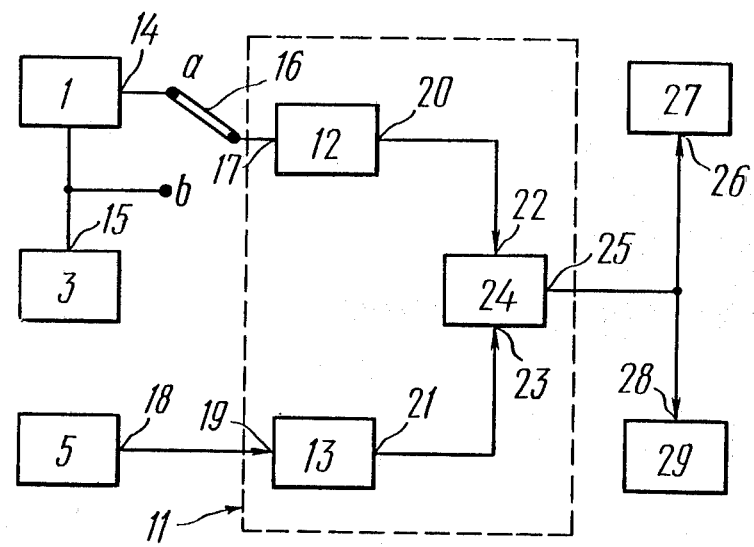
FIG. 3 represents a block diagram of an electrical circuit which is used in conjunction with the device shown in FIG. 1.

The device incorporates an electronic unit 11 (FIG. 3) designed for generating a signal proportional to the ratio of the output signals of the mentioned transducers or pick-ups. The electronic unit includes a channel 12 of losses of grain and a channel 13 of grain supply. The outputs 14 and 15 of the pick-ups 1 and 3 which measure grain losses, installed behind the rack 2 and the cleaner 4, respectively, are connected through the switch 16 to the input 17 of the channel 12 of losses of grain of the electronic unit 11.

The output 18 of the pick-up 5 which measures the amount of grain supplied to the hopper 6 of the grain combine is connected to the input 19 of the grain supply channel 13 of the electronic unit 11.

The outputs 20 and 21 of the channel 12 of the losses of grain and the channel 13 of the grain supply are connected to the inputs 22 and 23, respectively, of the electronic circuit in the nature of a ratio detector 24 which forms ratios of the signals at the inputs 22 and 23 of the electronic unit 11.

The output 25 of the electronic circuit or ratio detector 24 is, in turn, connected to the input 26 of the indicator 27 calibrated in relative units characterizing the relative magnitude or rates of grain flow and the changes in the process of separating grain in the thresher.

The indicator 27 is located in the operator's view sight.

The output 25 can also be connected to the input 28 of the device 29 for automatically controlling the speed of the grain combine or regulating its working members.

The principle of the device operation is founded on the comparison of the amount of grain proportional to that lost by the thresher of the grain combine and the amount of grain proportional to that which is supplied to the hopper of the grain combine at every moment of time.

The device operates in the following manner.

The mechanical pulses generated during the impact between the grains and the sensitive surfaces of the pickups or transducers 1, 3 and 5 are converted by the transducer or pick-ups to electrical signals which are supplied from the pick-ups 1 and 3 which measure the amount of grain lost by the thresher through the output 14 or 15 and the switch 16 to the input 17 of the channel 12 of the losses.

In case of the total measurements taken of the losses behind the rack 2 and the cleaner 4, the pick-ups 1 and 3 are connected in series, and their signals are summed up through the switch 16 installed in the position of "a" are supplied to the channel 12 of the losses.

When determining the losses individually behind the cleaner 4, the signal from the output 15 of the pick-up 3 is supplied through the switch 16 installed in the position of "b" to the channel 12 of the losses.

The electrical signals from the output 18 of the pick-up 5 of the amount of grain supplied to the hopper 6 are fed to the input 19 of the channel 13 of the supply. The channels 12 and 13 are designed to amplify and form signals coming from the pick-ups 1, 3 and 5.

The electrical output signals generated by the channels 12 and 13 of the losses and supply, respectively, are proportional to the number of pulses generated by the grains dropping onto the sensitive surfaces of the pick-ups 1, 3 and 5 and are supplied from the outputs 20 and 21 to the inputs 22 and 23, respectively, of the electronic circuit or ratio detector 24.

The electrical signal from the output 25 obtained in the electronic circuit 24 is supplied to the input 26 of the indicator 27 whose readings are proportional to the ratio of the amount of grain supplied to the pick-up.

The electrical signal from the output 25 can simultaneously be supplied to the input 28 of a device 29 for automatically controlling the speed of the combine or regulating its working members.

The device of the present invention allows the operator to detect in time the faults in the production process of separation which are caused due to changes in the operating conditions of the combine or changes in the conditions in plant mass being harvested, since these changes result in the variation of the grain flows controlled by the pick-ups, and, consequently, to the change in the indicator readings, thereby making it possible, in turn, to eliminate the causes of the faults in time.

The device makes it possible to detect abrupt variations in the amount of losses due to exceeding the value of the plant mass supply to the grain combine over that which is allowed under the given conditions of harvesting.

What is claimed is:

1. Device for controlling the magnitudes or rates of flow of grain supplied to the hopper of a grain combine having a sieve and the losses of grain in its thresher, comprising: first means located on a grain combine for detecting the amount of grain lost by the thresher and having an output and generating an output signal proportional to the amount of grain lost by the thresher; second means for detecting the amount of grain supplied to the hopper of the grain combine located under the sieve of the thresher and having an output and generating an output signal proportional to the amount of grain supplied to the hopper, a sensitive surface of said second means for detecting having an elongated form, with the elongated side of the surface being oriented in the direction of the longitudinal axis of the grain combine and the width of the surface being smaller than that of the sieve; an electronic unit having first and second inputs and an output, said first input of said electronic unit being connected to said output of said first means for detecting the amount of grain lost by the thresher for supplying a signal to said electronic unit proportional to the amount of grain lost by the thresher, said second input of said electronic unit being connected to said output of said second means for detecting the amount of grain supplied to the hopper of the grain combine for supplying to said electronic unit a signal proportional to the amount of grain supplied to the hopper, said electronic unit generating a signal proportional to the ratio of said signals of said first and second means for detecting; and an indicator having an input and an output, said input of said indicator being connected to said output of said electronic unit for receiving said signal of the electronic unit and transferring its value through the output to a scale connected therewith and calibrated in units characterizing the relative magnitudes or rates of the grain flow and the changes in the process of separation of the grain in the thresher.

2. A device as set forth in claim 1 wherein said second means for detecting the amount of grain supplied to the hopper of the grain combine is rigidly fastened by means of a bracket installed on the grain chute of the thresher.

3. A device as set forth in claim 1, wherein said second means for detecting is a piezoelectric transducer.

4. Device for controlling the rates of flow of grain supplied to the hopper of a grain combine and the losses in the latter, comprising first means mounted on the combine at a location where grain is lost for detecting the amount of grain lost from the combine and having an output and generating an output signal proportional to the amount of grain lost at said location; second means mounted on the combine at a location along the path which the grain moves on the way to the hopper for detecting the amount of grain supplied to the hopper of the grain combine and having an output and generating an output signal proportional to the amount of grain supplied to the hopper; electronic circuit means having first and second inputs and an output, said first input of said electronic circuit means being connected to said output of said first means for receiving a signal proportional to the amount of lost grain, said second input of said electronic circuit means being connected to said output of said second means for receiving a signal proportional to the amount of grain supplied to the hopper, said electronic circuit means generating a signal proportional to the ratio of said signals supplied by said first and second means; and an indicator having an input and an output and a scale calibrated in units characterizing the relative magnitudes of grain flow and losses, said input of said indicator being connected to said output of said electronic circuit means for receiving said signal proportional to said ratio and transferring its value through the output to said scale to provide an indication of the relative values of grain stored and lost in the combine.

* * * * *